May 28, 1935.　　　　　G. G. GILPIN　　　　　2,003,113
GONDOLA CAR ROOF
Filed Dec. 26, 1931　　　3 Sheets-Sheet 1
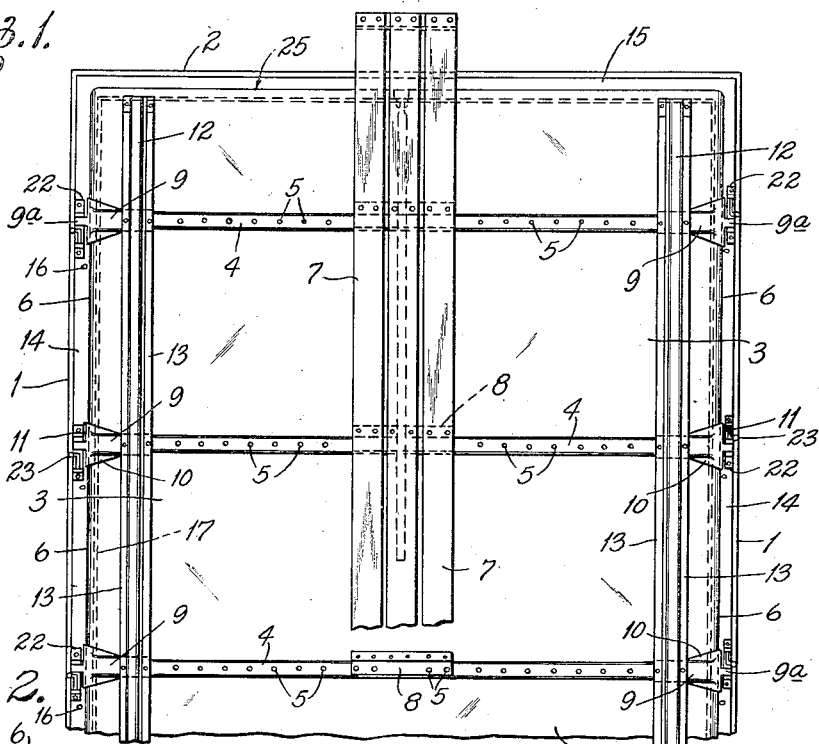
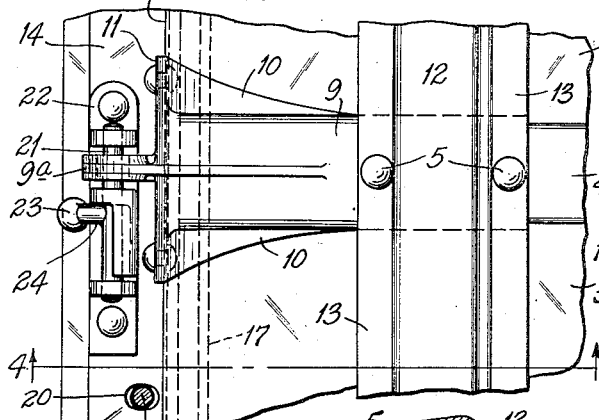
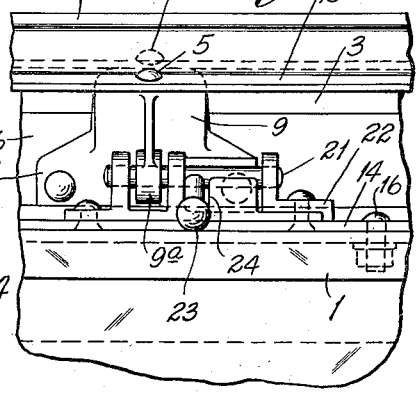
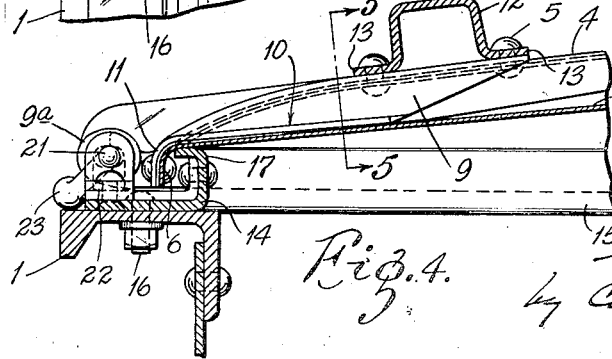
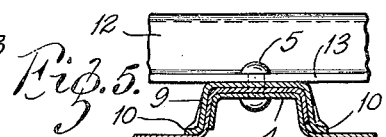

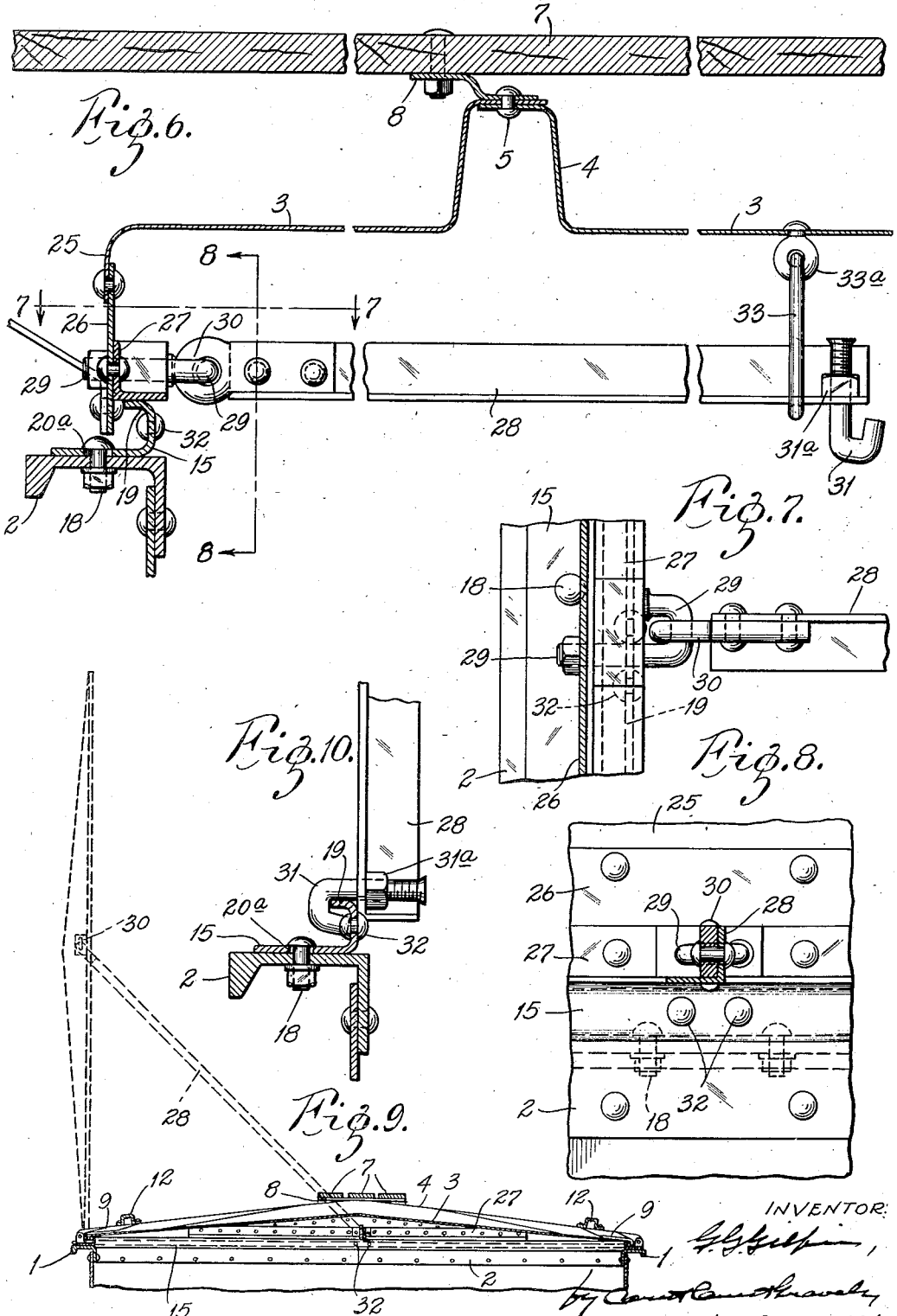

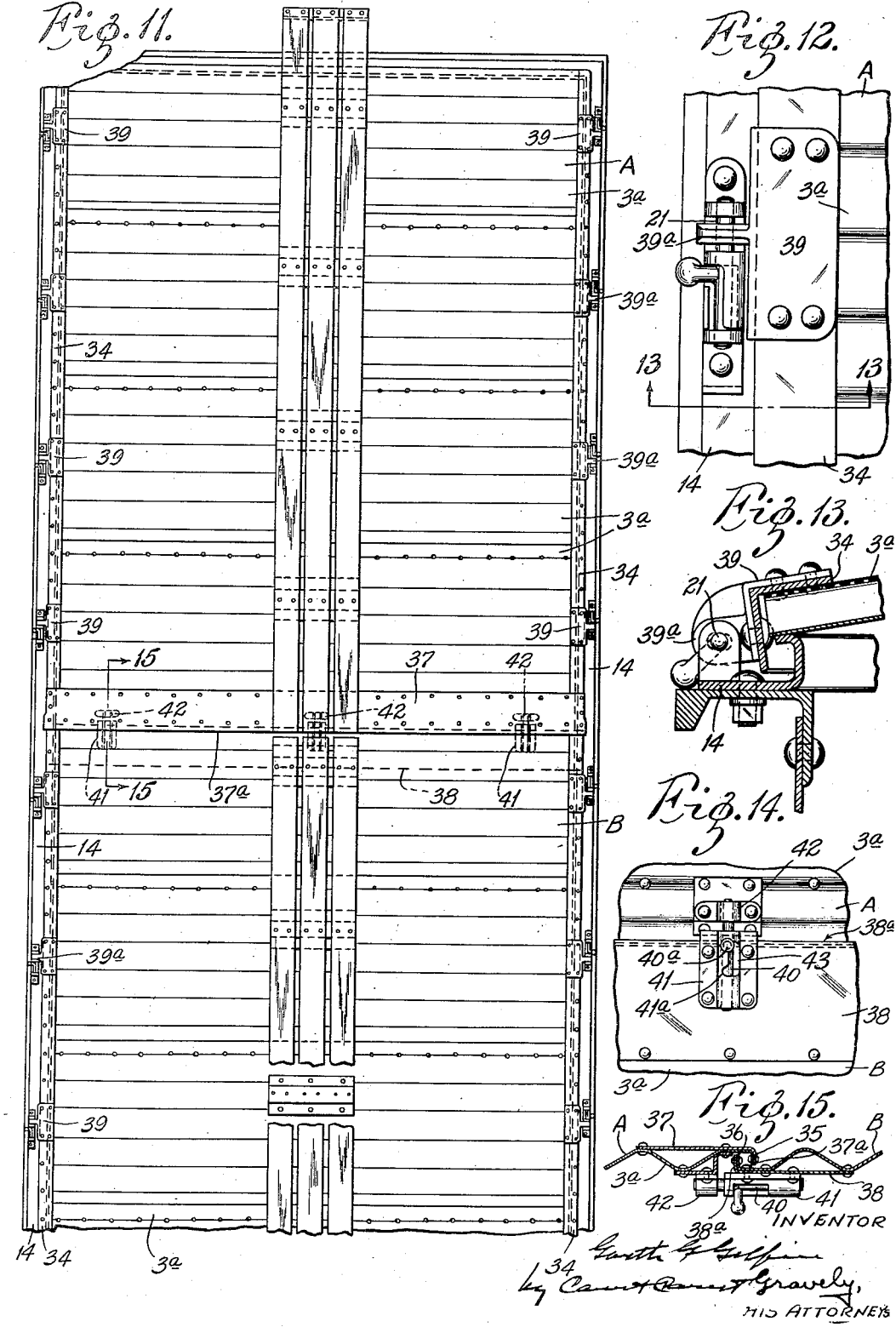

Patented May 28, 1935

2,003,113

UNITED STATES PATENT OFFICE 2,003,113

GONDOLA CAR ROOF

Garth G. Gilpin, Riverside, Ill., assignor to P. H. Murphy Company, New Kensington, Pa., a corporation of Pennsylvania Application December 26, 1931, Serial No. 583,272

7 Claims. (Cl. 105—377)

This invention relates to car roofs, particularly gondola car roofs. It has for its principal objects to provide a strong and rigid load sustaining sheet metal roof that can be applied to and removed from the car as a unit, that can be swung upwardly from either side of the car to permit access to be had thereto, that can be applied to cars of different widths and to cars with bowed side rails, and that will embody other advantages hereinafter appearing. The invention consists in the gondola car roof and in the construction, combinations and arrangements of parts hereinafter described and claimed.

In the accompanying drawings, which form part of this specification, and wherein like symbols refer to like parts wherever they occur, Fig. 1 is a plan view of a portion of a gondola car provided with a roof embodying my invention, Fig. 2 is an enlarged fragmentary plan view of the roof, showing one of the eaves fasteners, Fig. 3 is a side elevation of the parts shown in Fig. 2, Fig. 4 is a vertical transverse section through the eaves portion of the roof on the line 4—4 in Fig. 2, Fig. 5 is a vertical cross-section through one of the roof seams on the line 5—5 in Fig. 4, Fig. 6 is a vertical longitudinal section taken at one end of the car midway between the sides thereof, Fig. 7 is a horizontal section on the line 7—7 in Fig. 6, Fig. 8 is a vertical cross-section on the line 8—8 in Fig. 6, Fig. 9 is a vertical transverse section through the roof between seams, the dotted lines indicating the position of the roof when swung upwardly from one side of the car, Fig. 10 is a vertical cross-section through one of the end angles or plates of the car showing the manner of anchoring the free end of the brace in the raised position of the roof, Fig. 11 is a plan view of a gondola car roof of modified construction, Fig. 12 is a fragmentary plan view of the eaves end portion of the roof in the region of one of the members for fastening said roof to the side angles or plates of the car, Fig. 13 is a vertical cross-section through the roof on the line 13—13 in Fig. 12, Fig. 14 is a fragmentary bottom plan view of the roof, showing one of the fasteners for securing together adjacent roof sections; and Fig. 15 is a vertical cross-section on the line 15—15 of Fig. 11.

Referring to the accompanying drawings, my invention is shown in connection with a gondola car having side and end rails or plates 1 and 2, respectively, in the form of bulb angles arranged with their uppermost flanges facing outwardly. In the two constructions illustrated the roofs are self-supporting and are adapted to be swung upwardly from either side of said car or entirely removed therefrom.

The roof shown in Sheets 1 and 2 of the accompanying drawings comprises a series of metal roof sheets 3 that extend from side rail to side rail of the car and have their adjacent side marginal portions shaped, overlapped and rigidly secured by rivets 5 to form hollow upstanding weatherproofing seams 4 that serve to increase the load carrying capacity of the roof. The roof sheets are provided with depending eaves flanges 6; and the roof seams 4 are curved downwardly at their ends and merge into the depending eaves flanges 6 of the roof sheets. A running board 7 extends longitudinally of the roof midway between the eaves thereof and is securely bolted to the upwardly offset horizontal flanges of metal saddles 8 that rest on and are secured to the tops of the upstanding roof seams by the securing rivets 5 therefor.

Each eaves end portion of each roof seam 4 is covered by a channel-shaped hood member or cap 9 provided with outstanding base flanges 10 that rest on the roof on opposite sides of said seams and a depending end flange 11 that overhangs the depending eaves flanges 6 of adjacent roof sheets and is riveted thereto. Extending longitudinally of the roof adjacent to the eaves thereof are members 12 of substantially inverted channel-shaped section with outstanding base flanges 13 that rest on and are secured to the tops of the seam caps 9 and are secured thereto by the endmost seam rivets 5, which also serve to secure said seam caps to the seams 4. By this arrangement, the roof is strengthened and stiffened at the eaves by the longitudinal members 12 which also afford means for attaching a lifting device to the roof.

Mounted on and extending longitudinally of the top flanges of the side rails 1 and end rails 2 of the car are plates 14 and 15, respectively, for supporting the roof at the sides and at the ends of the car. The plates 14 are removably secured to the side rails 1 of the car preferably by means of vertical bolts 16 and are provided along their inner margins with upstanding flanges 17 that are bent outwardly at their upper ends to support the roof at the eaves; and likewise, the plates 15 are secured to the end rails 2 by vertical bolts 18 and are provided with flanges 19 for supporting the roof at the ends of the car. The bolt receiving openings in the side and end rail plates 14 and 15 are in the form of elongated slots 20 and 20a that extend transversely of the respective plates, thereby permitting adjustment of the plates cross-wise of the rails and facilitating the application of said plates to bowed or bent rails.

The roof is removably and pivotally secured at its eaves ends to the side rail plates 14 by means of fastening devices located adjacent to the eaves end of the roof seams 4. Each of these fastening devices comprises a pin or pintle 21 that is mounted for axial sliding movement in a bracket 22 that is riveted or otherwise rigidly secured to the side rail plate 14 adjacent to the eaves end of a roof seam. The pin 21 of the fastening device is arranged for horizontal sliding movement longitudinally of the side rail plate 14 and is adapted, in locking position, to project through a hole provided therefor in an outstanding lug 9a on the eaves end of the seam cap 9 for said seam and thus secure the roof to the car. The axially slidable pin 21 of the fastening device is provided with a transversely extending handle portion 23 adapted, when moved to locked position, to rest in a notch 24 provided therefor in the bracket 22 and thus prevent said pin from being accidentally disengaged from the opening in the lug 9a on the seam cap 9. By this arrangement, when all of the pins 21 on both sides of the car are disengaged from the seam caps the entire roof may be lifted off the car by means of a crane provided with devices adapted to extend beneath the inverted channels 12 that extend along the top of the roof adjacent to the eaves thereof. The entire roof may be swung upwardly from either side of the car by disengaging the securing bolts on one side of the car, the securing pins on the other side of the car serving as hinge or pivot pins about which the roof swings vertically.

Each end sheet of the roof is provided along its outer side margin with a depending flange 25 that is riveted to the top of an end plate 26 having a horizontal angle 27 riveted to the inner side thereof, which angle rests upon the outturned upper marginal portion of the upstanding inner flange 19 of the end rail plate 15. The roof is held in its raised or opened position by means of a brace 28 located at each end of the roof. Said brace is pivotally secured to the end angle of the roof, preferably by means of a hook 29 and an eye 30 attached to the end angle 27 and to one end of said brace, respectively. In the opened or raised position of the roof, the brace 28 is swung into a position crosswise of the car and its free end is anchored to the end rail plate 15 by means of a suitable fastening device preferably in the form of a J-bolt 31. The shank portion of the J-bolt is mounted in the free end of the brace for sliding movement transversely thereof and is provided with a nut 31a. By this arrangement, the free end of the brace is anchored to the end rail plate 15 by engaging the hook of the J-bolt with the top flange of said plate with the free end of the hook fitting between projections formed by rivets 32 that are spaced apart longitudinally of said flange. The nut 31a is then tightened to prevent the hook of the J-bolt from being accidentally disengaged from the flange of the end rail plate. In its inoperative position, the brace is disposed longitudinally of the roof with its free end supported in a loop or ring 33 that is attached to an eye 33a that depends from the underside of the roof.

By the arrangement described, the roof may be attached to and detached from the car as a unit, or it may be swung upwardly from either side of the car. The roof, when swung upwardly from either side of the car may be firmly held in either position by fastening the free ends of the brace members 28 to the end rail plates; and said brace members may be swung out of the way when the roof is closed or removed bodily from the car. The upstanding seams 4 serve to increase the strength and rigidity of the roof; and the roof is further stiffened and strengthened by means of the members 12 that extend longitudinally of the roof adjacent to the eaves and also provide means for attaching a lifting device to the roof.

The modified roof construction shown in Sheet 3 of the accompanying drawings comprises end and intermediate sections A and B, respectively, adapted to be picked up separately. Each roof section is made up of corrugated sheets 3a that extends from side to side of the car with their eaves ends resting upon the outwardly extending upper end portions of the upstanding inner flanges of the side rail plates 14. Angle members 34 extend longitudinally of the roof sections at the eaves with one flange riveted to the summits of the corrugations of the roof sheets and with the other flange extending downwardly and overhanging the ends of the roof sheets. These eaves angles serve to stiffen the roof sections and also afford means for attaching a suitable lifting device to the roof so that they can be picked up, and they also serve to close the openings at the ends of the corrugations. The inner end of the end roof section is provided with a depending flange 35 that overhangs an upstanding flange 36 on the adjacent end of the intermediate roof section. The adjacent end portions of the two roof sections are stiffened and strengthened by means of plates 37 and 38, respectively. The reinforcing plate 37 of the end roof section is riveted to the top of said sections and has a depending flange 37a that overhangs and is riveted to the depending flange 35 thereof; and the reinforcing plate 38 of the intermediate roof section is secured to the underside of said section and has an upstanding flange 38a riveted to the upstanding flange 36 thereof.

The roof sections are removably and hingedly secured to the side rail plates 14 by means of fasteners similar to those illustrated on Sheet 1 of the drawings, the pin or pintles 21 of the fastening devices being adapted to extend through openings provided therefor in outstanding lugs 39a formed integral with angle-shaped castings 39 that are riveted to the eaves angles 34 of the roof sections at intervals throughout their length. The adjacent ends of the roof sections may be secured together by fastening devices in order to permit the entire roof to be handled as a unit when it is mounted on and dismounted from the car or swung upwardly from either side thereof. Each of said fastening devices preferably comprises a pin or pintle 40 slidably mounted in a bracket 41 secured to the underside of one section and adapted to cooperate with a keeper 42 secured to the underside of the other section. The pin or pintle 40 is provided with a radially extending handle portion 40a slidable in an elongated slot 43 in the supporting bracket 41 therefor. This slot is provided at its opposite ends with notches 41a adapted to receive the handle 42 and hold the pin or pintle 40 in its engaged and disengaged positions. The end construction of the roof and the braces employed for holding the roof in the raised position are similar to that shown in Sheet 2 of the drawings.

Obviously, my invention admits of considerable modification in the design of roof sheets, roof seams and fastening devices, and I do not wish to be limited to the specific constructions shown and described.

What I claim is:

1. A gondola car roof comprising a series of roof sheets spanning the car from side to side and connected together to form a self-supporting roof, hinge devices for securing the roof to the car at the eaves, said devices including slidable pivots adapted to be engaged with and disengaged from said roof, whereby said roof is adapted to be swung upwardly from either side of the car or removed bodily therefrom, and a brace located entirely inside of and carried entirely by the roof in closed position for supporting the roof when it is swung upwardly from either side of the car.

2. A gondola car roof comprising a series of roof sheets spanning the car from side to side and connected together to form a self-supporting roof, hinge devices for securing the roof to the car at the eaves, members attached to the eaves of the roof and provided with openings, said hinge devices including pivot pins mounted on the car and slidably engaging said openings, whereby said roof is adapted to be swung upwardly from either side of the car or removed bodily therefrom, means for holding the roof in its raised position, said means comprising a brace pivotally connected at one end to said roof for vertical and horizontal swinging movement relative thereto, and means on the other end of said brace for removably securing the brace to the car.

3. A gondola car roof comprising a series of roof sheets spanning the car from side to side and connected together to form a self-supporting roof, hinge devices for securing the roof to the car at the eaves, said fastening means comprising pivot pins mounted on the car and slidably engaging said roof, whereby said roof is adapted to be swung upwardly from either side of the car or removed bodily therefrom, means for holding the roof sheets in raised position, said means comprising a brace pivotally connected at one end to said roof, means on the other end of said brace for removably securing the brace to the car when the roof is swung upwardly from either side of the car, and means attached to the roof for supporting the free end of said brace member in the inoperative position thereof.

4. A gondola car comprising side rails, a roof comprising self-supporting roof sheets extending from side rail to side rail of the car, means for securing adjacent margins of said sheets together to form weatherproofing joints therebetween, and plates secured to the tops of said side rails and provided with upstanding flanges adapted to support the eaves ends of the roof sheets, fastening devices for removably securing the roof to said plates, and members extending longitudinally of the roof along the top thereof adjacent to said side rails for stiffening the roof and for facilitating the connection of a lifting device thereto.

5. A car roof spanning the car from side to side, means securing the roof to the car at the eaves, said means comprising pivots about which the roof is adapted to swing vertically, a brace pivotally connected at one end to said roof, means for removably securing the other end of said brace to the car in the raised position of the roof, and means for suspending said other end of said brace from the underside of said roof in inoperative position of said brace.

6. A car comprising side rails, roof sheets extending from side rail to side rail of the car and connected along their adjacent margins by weatherproofing seams, plates secured to the tops of said side rails and provided with upstanding flanges adapted to support the roof, pivots connecting said roof to said plates, said pivots being supported on said plates inside the outer edges thereof.

7. A car comprising side rails, a series of roof sheets extending from side rail to side rail of the car and connected along their adjacent margins by upstanding seams, hood members rigidly secured to said roof sheets and covering the ends of said seams, members extending longitudinally of the car across the tops of said hood members rigidly secured thereto, and detachable pivotal connections between said hoods and the side rails of the car.

GARTH G. GILPIN.